(12) United States Patent
Solares

(10) Patent No.: US 8,407,934 B1
(45) Date of Patent: Apr. 2, 2013

(54) TREE PLANTING SUPPORT SYSTEM

(76) Inventor: Andres Solares, Miami, FL (US)

( * ) Notice: Subject to any disclaimer, the term of this patent is extended or adjusted under 35 U.S.C. 154(b) by 353 days.

(21) Appl. No.: 12/964,794

(22) Filed: Dec. 10, 2010

(51) Int. Cl.
*A01G 17/04* (2006.01)
(52) U.S. Cl. .......................................................... 47/42
(58) Field of Classification Search .................. 47/42, 43
See application file for complete search history.

(56) References Cited

U.S. PATENT DOCUMENTS

| | | | |
|---|---|---|---|
| 1,021,650 A * | 3/1912 | Worthington | 47/43 |
| 2,501,255 A | 3/1950 | Bell | |
| 4,778,140 A * | 10/1988 | Karlewski | 248/524 |
| 5,337,990 A | 8/1994 | Brown | |
| 5,368,269 A * | 11/1994 | Boisseau | 248/351 |
| 5,950,359 A | 9/1999 | Pivnik | |
| 6,128,851 A | 10/2000 | Ralston | |
| 6,370,817 B1 | 4/2002 | Brooks et al. | |
| 6,612,071 B1 * | 9/2003 | Steadman | 47/42 |
| 6,991,203 B2 * | 1/2006 | Steadman | 248/230.8 |
| 2002/0078624 A1 | 6/2002 | Saxon et al. | |
| 2009/0119984 A1 | 5/2009 | Nabhan | |

* cited by examiner

*Primary Examiner* — Frank T Palo
(74) *Attorney, Agent, or Firm* — Albert Bordas, P.A.

(57) ABSTRACT

A tree planting support system that mounts onto a tree trunk to stabilize a recently planted tree in a substantially vertical position until its root system can hold it in that orientation without the need for additional support. It has a housing assembly with a top wall, a bottom wall, a rear wall, first and second sidewalls, an angled front wall extending between first and second front walls, and at least one slot. The housing assembly further has a first interior base wall defining an angled cavity section, and a second interior base wall defining another angled cavity section. At least one band is secured through the at least one slot and at least one support post has first and second ends. A stake assembly also has two angled cavity sections.

20 Claims, 6 Drawing Sheets

TREE PLANTING SUPPORT SYSTEM

BACKGROUND OF THE INVENTION

1. Field of the Invention

The present invention relates to planting systems, and more particularly, to tree planting systems to stabilize the trunks of recently planted trees in a substantially vertical position until their root system can hold the trees in that orientation without the need for additional support.

2. Description of the Related Art

Tree planting support systems function to stabilize the trunks of recently planted trees. Typical systems include several posts that are positioned around the trunk of a tree, at a predetermined angle to the ground. The posts are typically nailed to blocks of wood that in turn, are fixed to strap assemblies or the like that damage the posts, blocks of wood, and tree trunks in some cases.

Applicant believes that one of the closest references corresponds to U.S. Pat. No. 6,370,817 issued to Brooks, et al. on Apr. 16, 2002 for a tree bracing system. However, it differs from the present invention because Brooks, et al. teaches a manual and tool adjustable, reusable tree bracing assembly to support a tree in a substantially vertical position, being specifically structured to allow mounting and removal of the assembly about a tree trunk by a single worker wherein the assembly comprises padded support members movably positionable at spaced apart locations from one another about the circumference of a tree trunk along a length of two adjustable straps and further including at least three brace members and at least three padded support members accommodating the straps wherein one support member is adjustably configured to provide virtually non-slip strap attachment with lock-down option and wherein the distal end of each brace member engages a base member removably fixed to the ground or to a tree grate substantially adjacent the tree trunk and the proximal end of each support member is disposed in abutting engagement with the outer surface of the grooved, padded support members so as to exert a supportive, bracing force on the tree trunk yet reduce or eliminate the possibility of moisture accumulation, mildew, scarring and erosion of the exterior surface of the tree trunk.

Applicant believes that another reference corresponds to U.S. Pat. No. 6,612,071 issued to Steadman on Sep. 2, 2003 for a support apparatus for trees. However, it differs from the present invention because Steadman teaches a support apparatus for trees comprising a mounting part in the form of a plurality of brackets interconnected by ties, engageable around the tree, and a ground-engaging member extendible from each bracket at an inclination to the tree.

Applicant believes that another reference corresponds to U.S. Pat. No. 6,128,851 issued to Ralston on Oct. 10, 2000 for a tree support assembly. However, it differs from the present invention because Ralston teaches an assembly for supporting a tree in an upright position that includes an elongated tubular collar for receiving a tree branch that is separable into two half-portions allowing a user to easily attach or remove the device. The collar has a plurality of apertures thereon for receiving supplemental support legs to further support the collar when placed around the tree trunk. One or more secondary collars may be placed on top of the first collar to which additional supplemental support legs or tubular arms may be attached for supporting the tree's branches.

Applicant believes that another reference corresponds to U.S. Pat. No. 5,950,359 issued to Pivnik on Sep. 14, 1999 for a tree staking system. However, it differs from the present invention because Pivnik teaches a staking assembly designed to support a tree in a substantially upright position and being specifically structured to allow operative installation or mounting of the assembly about a tree trunk by a single worker wherein the assembly comprises a plurality of support members movably positionable at spaced apart locations from one another about the circumference of a tree trunk along a length of an attachment assembly, and further including a plurality of brace members at least equal in number to the number of support members wherein each brace member includes a distal end engaging the ground substantially adjacent the tree trunk and a proximal end disposed in abutting, force exerting engagement with an outer surface of one of the plurality of support members so as to exert a supportive, bracing force on the tree trunk. A protective pad or like structure is formed on the inner surface of each support member and disposable in confronting engagement with the exterior surface of the tree trunk so as to eliminate or reduce the possibility of scaring or blemishing the tree trunk surface.

Applicant believes that another reference corresponds to U.S. Pat. No. 5,337,990 issued to Brown on Aug. 16, 1994 for a dual-purpose adjustable tree stand unit. However, it differs from the present invention because Brown teaches a rugged adjustable tree stand designed to hold trees of varying sized in an adjustable upright position and to provide water to prevent drying and shedding of needles from the tree.

Applicant believes that another reference corresponds to U.S. Pat. No. 2,501,255 issued to Bell on Mar. 21, 1950 for a tree support. However, it differs from the present invention because Bell teaches a tree splint comprising a pair of arcuate semicircular clamping members, a radial ear on the ends of each of said members, the ears of one of said members formed with radially disposed outwardly opening slots, bolts rockably carried by the ears of the other member slidably engageable in said slots, means on said bolts for clamping said members together, a segmental arcuate splint member of an arc less than said clamping members fixedly carried by each of said clamping members engageable about the trunk of the tree, a pair of downwardly and outwardly inclined supporting legs on one of said clamping members and an outwardly and downwardly inclined leg on the other of said clamping members constituting a tripod for supporting said splint on a tree.

Applicant believes that another reference corresponds to U.S. Patent Application Publication No. 2002/0078624, published on Jun. 27, 2002 to Saxon, et al. for Tree Support. However, it differs from the present invention because Saxon, et al. teach a tree support that holds the tree in the desired orientation until its root system can hold the tree in that orientation without the need for additional support. The tree support includes a collar and three or more legs. Positioning screws carried by the collar advance radially inward toward the trunk of the tree to engage the trunk and thereby hold the collar in place. The outer ends of the positioning screws are capped with ornamental medallions. The medallions can carry any design or, for example, initials or information about the tree. One embodiment of leg for the tree stand is a telescoping, rigid leg that pushes against movement of the tree away from normal orientation. The other embodiment of the leg uses tension on wires connected to anchor screws inserted into the ground to hold the tree upright.

Applicant believes that another reference corresponds to U.S. Patent Application Publication No. 2009/0119984, published on May 14, 2009 to Nabhan for Apparatus and Method For Planting and/or Training Trees. However, it differs from the present invention because Nabhan teaches an adjustable trunk support system, which restrains a tree trunk within a specified containment area without permanently attaching to the trunk. One or more trunk supports are vertically adjustable to allow multiple trunk supports to be embedded in the ground at different heights on a slope while restraining the tree at the same height on the trunk. Adjustable arms laterally extend from the trunk supports such that the size of the containment area can be adjusted to accommodate tree growth. Adjustable locking ties secure to the adjustable arms to provide increased stability, and to provide pressure for the purpose of restraining, and/or training, a tree trunk.

Other patents describing the closest subject matter provide for a number of more or less complicated features that fail to solve the problem in an efficient and economical way. None of these patents suggest the novel features of the present invention.

SUMMARY OF THE INVENTION

The instant invention is a tree planting support system, comprising a housing assembly with a top wall, a bottom wall, a rear wall, first and second sidewalls, an angled front wall extending between first and second front walls, and at least one slot. The top wall is longer than the bottom wall. The housing assembly further comprises a first interior base wall at a predetermined distance from the angled front wall defining an angled cavity section, and a second interior base wall at another predetermined distance from the angled front wall defining another angled cavity section. It is noted that the second predetermined distance is greater than the first predetermined distance. At least one band is secured through the at least one slot. At least one support post has first and second ends. The first end inserts into its either angled cavity section.

In a preferred embodiment, a stake assembly has two angled cavity sections to receive the second end of the support post. In a preferred embodiment, the rear wall is concave in shape.

Each angled cavity section of the housing assembly is approximately similar in dimension to its respective angled cavity section of the stake assembly. However, the angled cavity sections of the housing assembly are different in size.

It is therefore an object of this invention to provide a tree planting support system that is reusable, for stabilizing tree trunks of recently planted trees in a substantially vertical position until their root system can hold the trees in that orientation without the need for additional support.

It is another object of this invention to provide a tree planting support system that circumferentially braces and/or supports a trunk portion of a tree without causing damage to the exterior surface of the tree trunk at points where supporting forces are applied.

It is another object of this invention to provide a tree planting support system that can be easily mounted to and dismounted from trees without damaging the instant invention or the tree.

It is another object of this invention to provide a tree planting support system, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
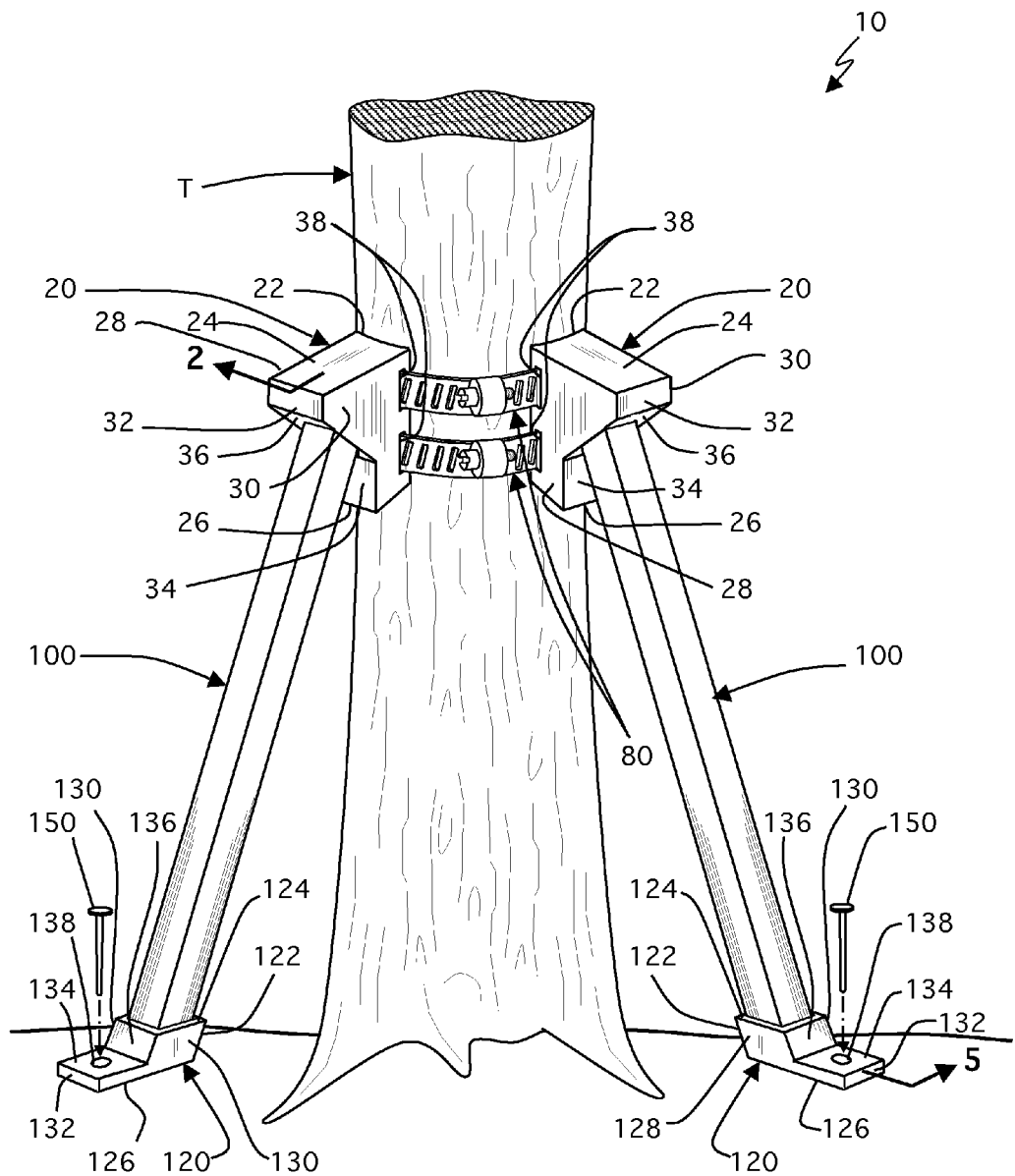
FIG. 1 is an isometric view of the present invention mounted onto a tree trunk to stabilize the recently planted tree in a substantially vertical position until its root system can hold the tree in that orientation without the need for additional support.

Referring now to the drawings, the present invention is a tree planting support system and is generally referred to with numeral 10. It can be observed that it basically includes housing assembly 20, band 80, and stake assembly 120.

As seen in FIG. 1, tree planting support system 10 is mounted onto a tree trunk to stabilize recently planted tree T in a substantially vertical position until its root system can hold it in that orientation without the need for additional support. Housing assembly 20 has top wall 24, bottom wall 26, rear wall 22, first and second sidewalls 28 and 30 respectively, and angled front wall 36 extending between first and second front walls 32 and 34 respectively. In a preferred embodiment, rear wall 22 is concave in shape to complement the tree trunk shape of tree T, and top wall 24 is longer than bottom wall 26.

Housing assembly 20 further comprises at least one slot 38 to secure its respective band 80. As seen in this illustration, housing assembly 20 may comprise multiple slots 38 for respective multiple bands 80. Specifically, at least one slot 38 extends from sidewall 28 through sidewall 30 at a predetermined distance from rear wall 22. Slots 38 removably receive bands 80 to mount housing assembly 20 to tree T. Bands 80 may have a fastening system to keep bands 80 in place. At least one support post 100 has first and second ends.

Figure 2:
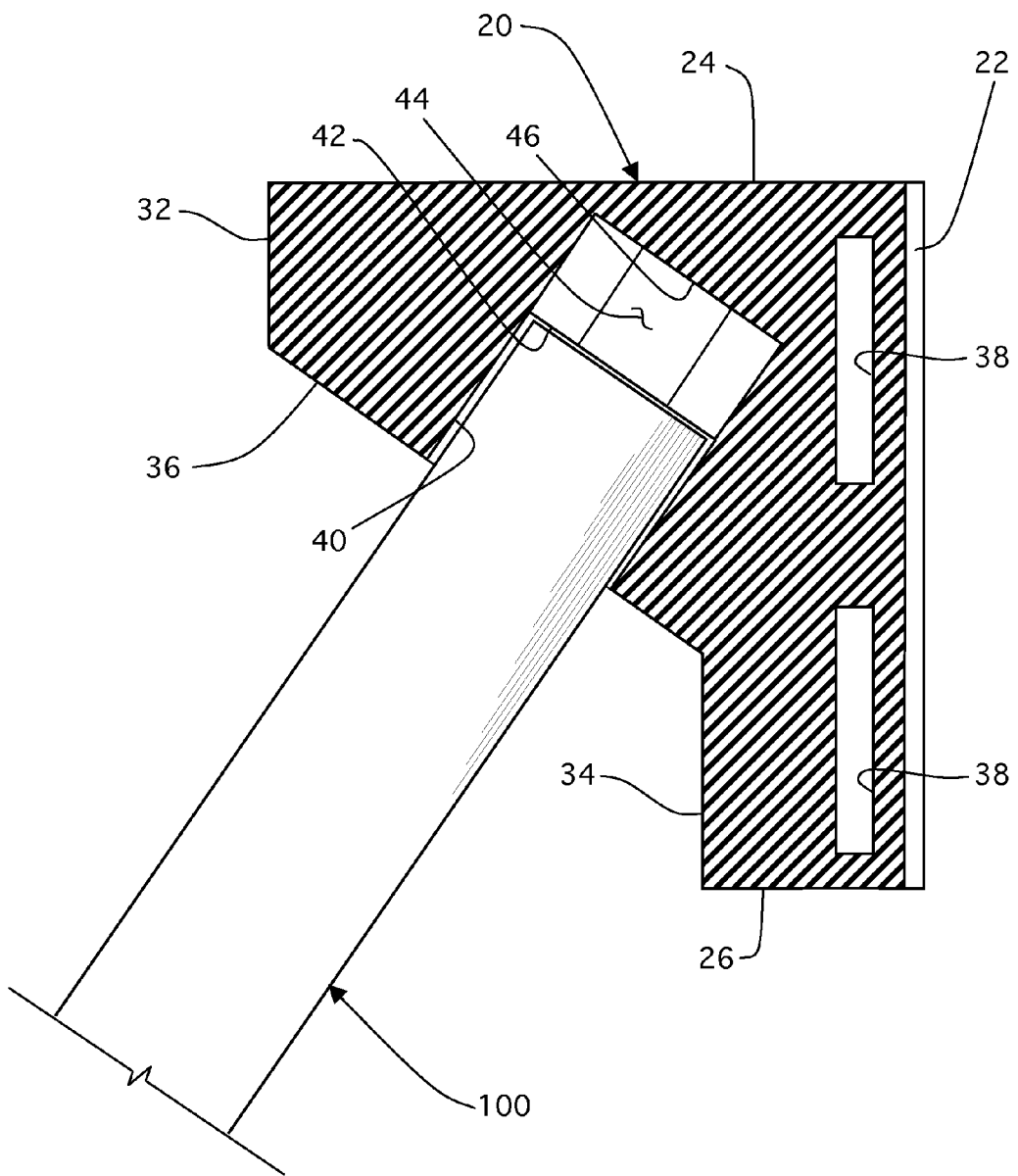
FIG. 2 is a cross-section view of the housing assembly taken along line 2 seen in FIG. 1.
Figure 3:
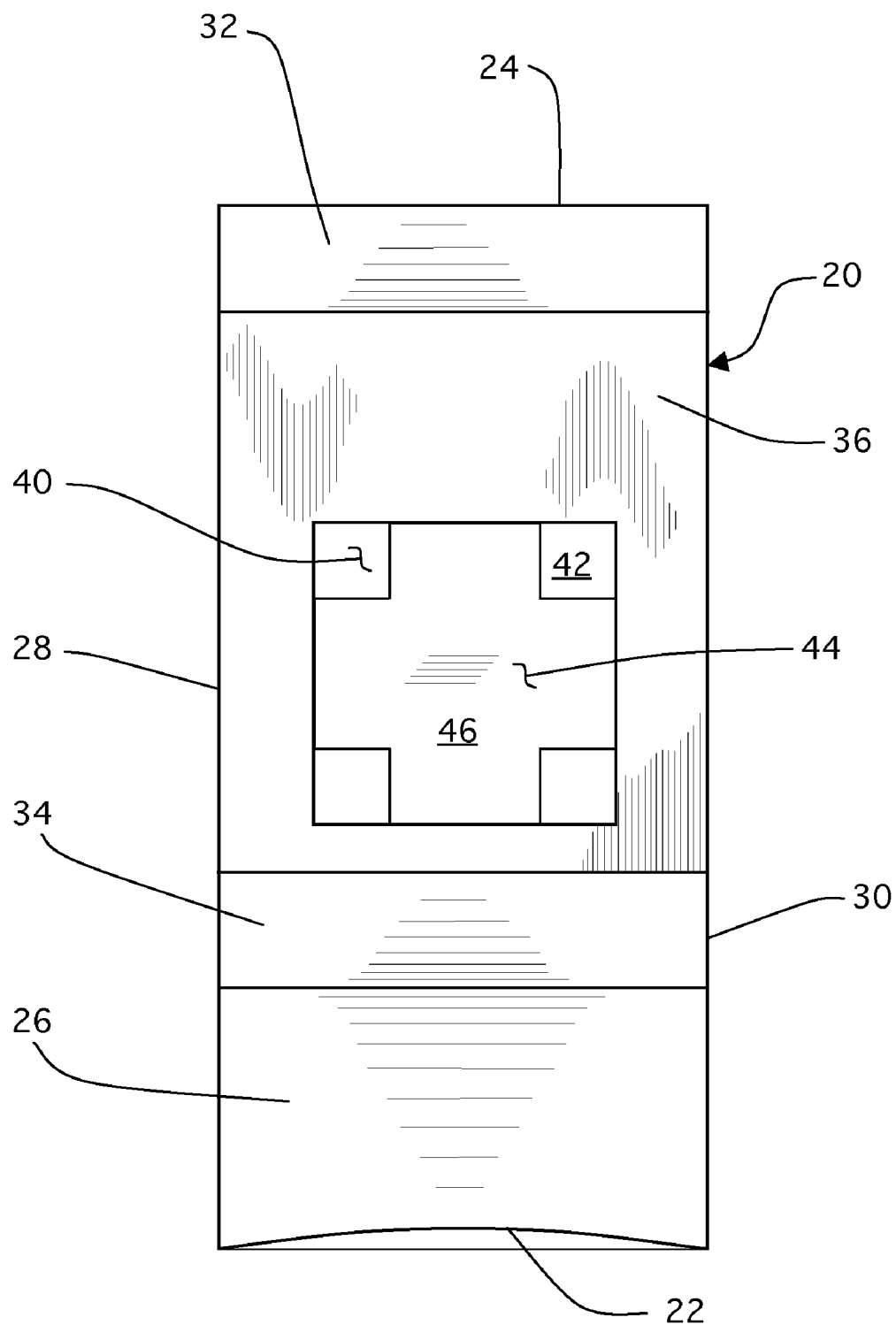
FIG. 3 is a front elevational view of the housing assembly, taken perpendicularly to the angled front wall.

As best seen in FIGS. 2 and 3, interior base wall 42 is at a predetermined distance from angled front wall 36 to define angled cavity section 40. In a preferred embodiment, interior base wall 42 is perpendicular to angled front wall 36. And interior base wall 46 is at another predetermined distance from angled front wall 36 to define angled cavity section 44. In a preferred embodiment, interior base wall 46 is also perpendicular to angled front wall 36. It is noted that the predetermined distance to interior base wall 46 is greater than the predetermined distance to interior base wall 42. Cavities 40 and 44 have cooperative shapes and dimensions to receive posts 100 and 100', respectively, of at least two different dimensions and sizes.

Figure 5:
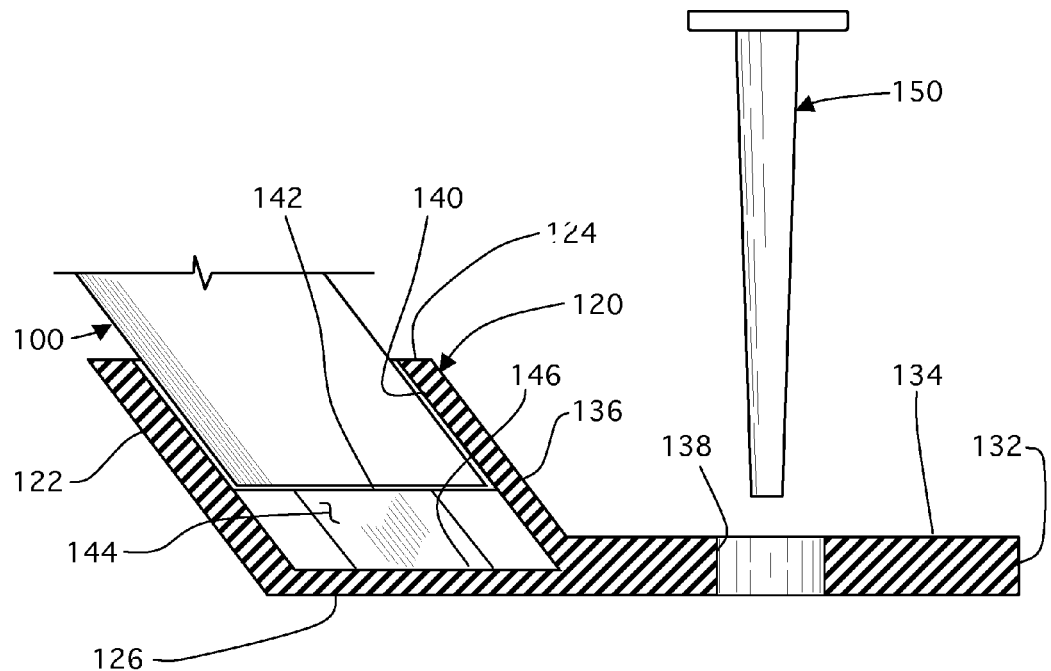
FIG. 5 is cross-section view of the stake assembly taken along line 5 seen in FIG. 1.

As seen in FIGS. 2 and 5, at least one support post 100 is of a predetermined dimension and size, six feet by four inches by four inches as an example, and snugly fits within angled cavity section 40 of housing assembly 20 and angled cavity section 140 of stake assembly 120. Therefore, angled cavity section 40 of housing assembly 20 and angled cavity section 140 of stake assembly 120 are approximately similar in shape and dimension.

Figure 6:
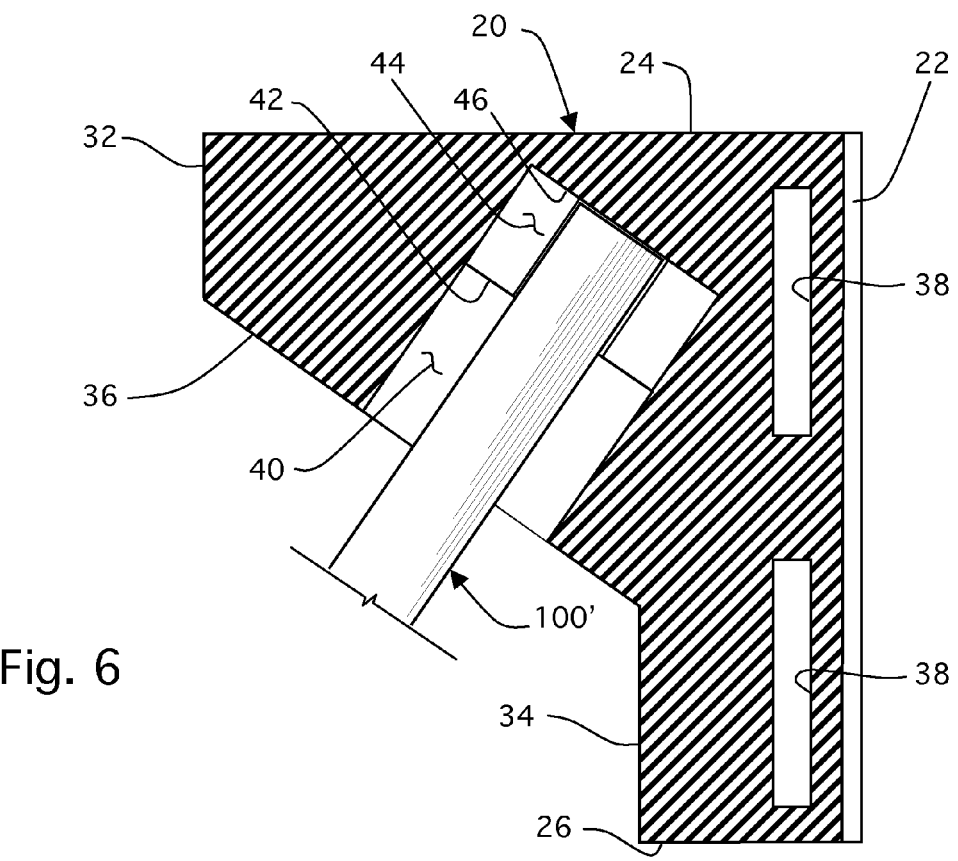
FIG. 6 is a cross-section view of the housing assembly seen in FIG. 2, with a post assembly of different dimensions secured therein and in a first orientation.
Figure 8:
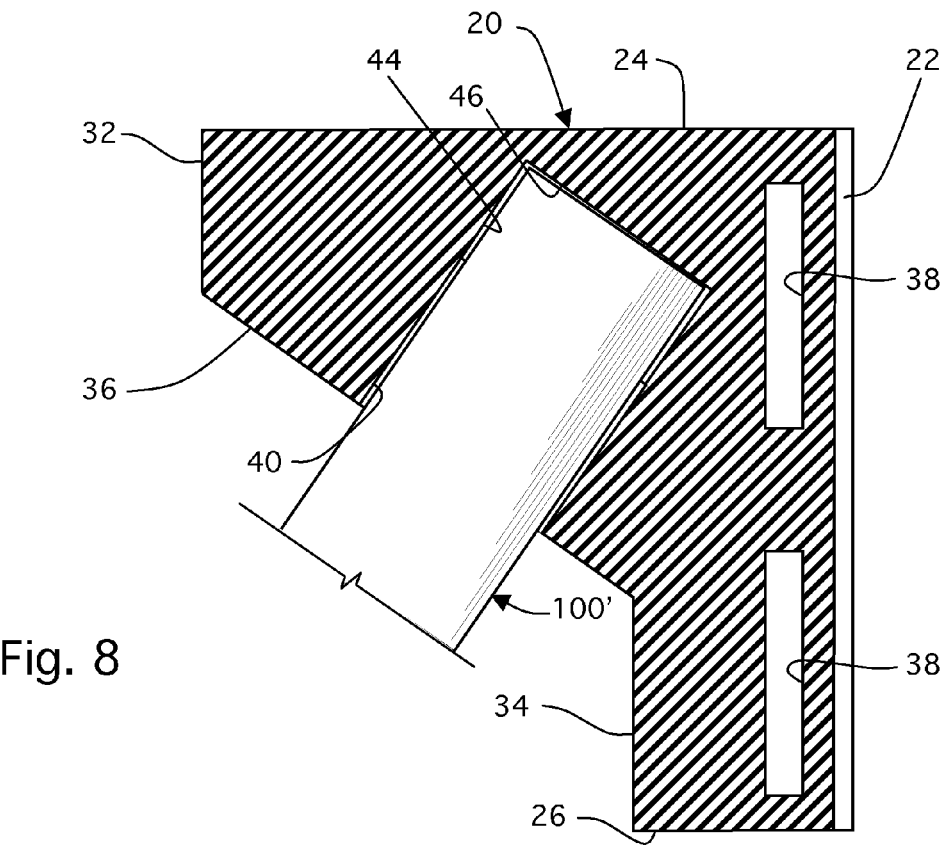
FIG. 8 is a cross-section view of the housing assembly seen in FIG. 6, with the post assembly secured therein and in a second orientation.

As best seen in FIGS. 3, 6, and 8, angled cavity section 44 can be of a unique shape to accommodate a matching end of at least one support post 100'. As best seen in FIG. 3, angled cavity section 44 can be of a unique shape, such as a plus sign as an example, to accommodate a matching end of at least one support post 100', or in the first or second configuration.

Figure 4:
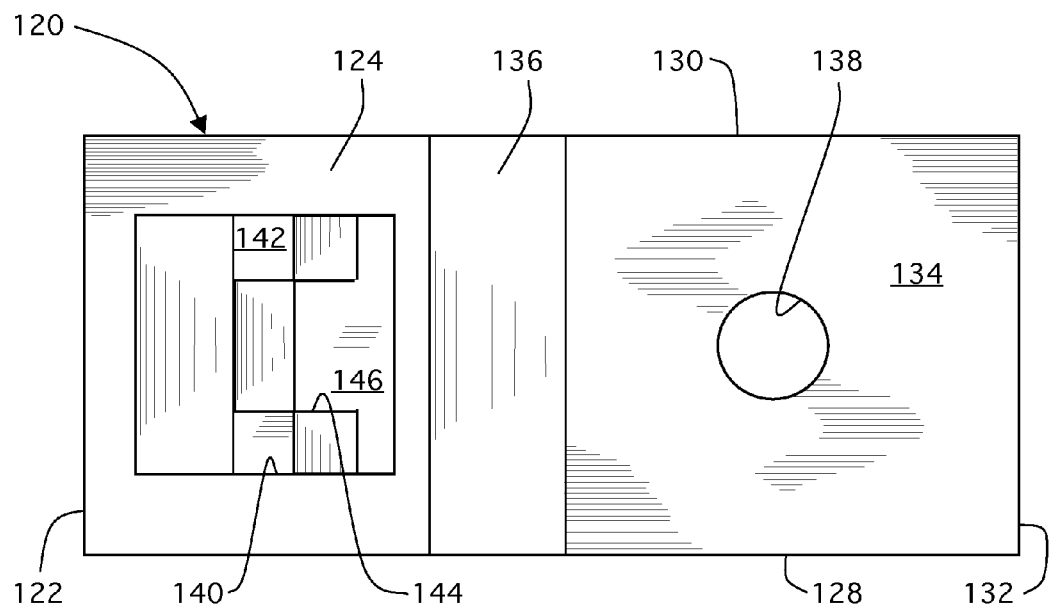
FIG. 4 is a top plan view of the stake assembly.

As best seen in FIGS. 4 and 5, stake assembly 120 has interior base wall 142 defining angled cavity section 140, and interior base wall 146 defining angled cavity section 144. Angled cavity section 144 can be of a unique shape, such as a plus sign as an example, to accommodate a matching end of at least one support post 100', or in the first or second configuration.

Stake assembly 120 also comprises rear wall 122, top wall 124, bottom wall 126, sidewalls 128 and 130, front wall 132, top wall 134 and angled front wall 136. Through hole 138 extends from top wall 134 through bottom wall 126. Through hole 138 receives stake 150 therethrough to secure stake assembly 120 to the ground. Rear wall 122 and angled front wall 136 are parallel to each other.

Figure 7:
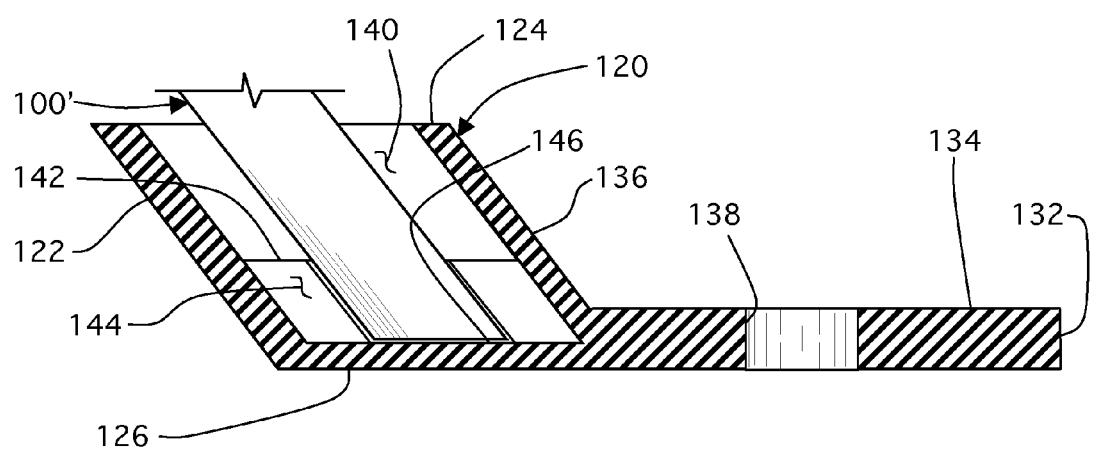
FIG. 7 is a cross-section view of the stake assembly seen in FIG. 5, with the post assembly of different dimensions secured therein and in the first orientation.

As seen in FIGS. 6 and 7, at least one support post 100' is of another predetermined dimension and size, four feet by two inches by four inches as an example, and snugly fits within angled cavity section 44 of housing assembly 20 and angled cavity section 144 of stake assembly 120 in a first orientation.

Figure 9:
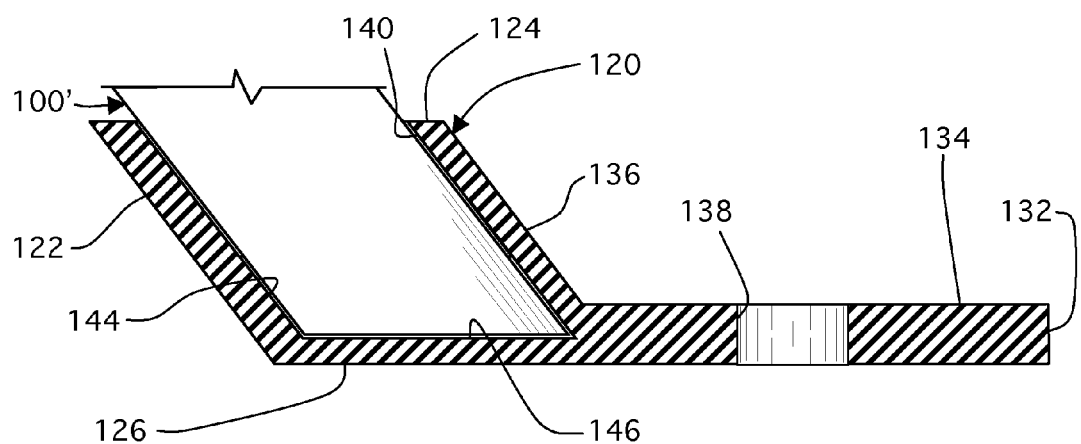
FIG. 9 is a cross-section view of the stake assembly seen in FIG. 7, with the post assembly secured therein and in the second orientation.

As seen in FIGS. 8 and 9, at least one support post 100' is of the other predetermined dimension and size, four feet by two inches by four inches as an example, and snugly fits within angled cavity section 44 of housing assembly 20 and angled cavity section 144 of stake assembly 120 in the second orientation. Angled cavity section 44 of housing assembly 20 and angled cavity section 144 of stake assembly 120 are approximately similar in shape and dimension.

To mount instant invention 10, a user accommodates housing assembly 20 at a convenient position on tree T, and secures it with bands 80. Each support post of convenient dimensions and shape, such as 100 or 100' is selected and inserted within the corresponding cavity of housing assembly 20. Then, the other end of the support post is inserted into the corresponding cavity of stake assembly 120. Stake assembly 120 is then secured into the ground with stake 150.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tree planting support system, comprising:
    A) a housing assembly having a first top wall, a first bottom wall, a rear wall, first and second sidewalls, and an angled front wall extending between first and second front walls, said housing assembly further comprising at least one slot, and a first interior base wall at a first predetermined distance from said angled front wall defining a first angled cavity section;
    B) at least one band secured through said at least one slot; and
    C) at least one support post having first and second ends, said first end inserted into its respective said first angled cavity section.

2. The tree planting support system set forth in claim 1, further comprising a stake assembly having a second angled cavity section to receive said second end of said at least one support post.

3. The tree planting support system set forth in claim 1, further characterized in that said rear wall is concave in shape.

4. The tree planting support system set forth in claim 2, further characterized in that said first and second angled cavity sections are approximately similar in dimension.

5. The tree planting support system set forth in claim 1, further characterized in that said first top wall is longer than said first bottom wall.

6. The tree planting support system set forth in claim 1, further characterized in that said housing assembly further comprises a second interior base wall at a second predetermined distance from said angled front wall defining a second angled cavity section.

7. The tree planting support system set forth in claim 6, further characterized in that said second predetermined distance is greater than said first predetermined distance.

8. The tree planting support system set forth in claim 6, further characterized in that said first angled cavity section is different in size than said second angled cavity section.

9. The tree planting support system set forth in claim 2, further characterized that said stake assembly further comprises a third angled cavity section to receive said second end of said at least one support post.

10. The tree planting support system set forth in claim 9, further characterized in that said second angled cavity section is different in size than said third angled cavity section.

11. A tree planting support system, comprising:
    A) a housing assembly having a first top wall, a first bottom wall, a rear wall, first and second sidewalls, and an angled front wall extending between first and second front walls, and at least one slot, said housing assembly further comprises a first interior base wall at a first predetermined distance from said angled front wall defining a first angled cavity section, and a second interior base wall at a second predetermined distance from said angled front wall defining a second angled cavity section;
    B) at least one band secured through said at least one slot; and
    C) at least one support post having first and second ends, said first end inserted into its respective said first angled cavity section or said second angled cavity section.

12. The tree planting support system set forth in claim 11, further comprising a stake assembly having a third angled cavity section to receive said second end of said at least one support post.

13. The tree planting support system set forth in claim 11, further characterized in that said rear wall is concave in shape.

14. The tree planting support system set forth in claim 12, further characterized in that said first and third angled cavity sections are approximately similar in dimension.

15. The tree planting support system set forth in claim 11, further characterized in that said first top wall is longer than said first bottom wall.

16. The tree planting support system set forth in claim 11, further characterized in that said second predetermined distance is greater than said first predetermined distance.

17. The tree planting support system set forth in claim 11, further characterized in that said first angled cavity section is different in size than said second angled cavity section.

18. The tree planting support system set forth in claim 11, further characterized in that said first angled cavity section is different in size than said second angled cavity section.

19. The tree planting support system set forth in claim 11, further comprising a stake assembly having a third interior base wall defining a third angled cavity section, and a fourth interior base wall defining a fourth angled cavity section.

20. The tree planting support system set forth in claim 19, further characterized in that said third angled cavity section is different in size than said fourth angled cavity section.

* * * * *